United States Patent [19]

Prosen

[11] 3,877,877

[45] Apr. 15, 1975

[54] PLASTIC CELL FOR MIXING TWO LIQUIDS OR A LIQUID AND A SOLID

[75] Inventor: Edward J. Prosen, Rockville, Md.

[73] Assignee: The United States of America as represented by the Secretary of Commerce, Washington, D.C.

[22] Filed: Oct. 31, 1973

[21] Appl. No.: 411,539

[52] U.S. Cl. .................. 23/259; 23/292; 73/190; 206/219; 259/60
[51] Int. Cl. ........ B01l 3/00; G01k 17/00; B01f 5/00
[58] Field of Search ............... 23/259, 292, 253 TP; 73/190; 259/48, 60; 206/84, 219, 221

[56] References Cited
UNITED STATES PATENTS 3,193,357 7/1965 Benzinger ........................... 23/259
3,211,531 10/1965 Benzinger ......................... 73/190 R
3,298,790 1/1967 Benzinger ......................... 73/190 R
3,477,820 11/1969 Wadso ............................. 73/190 R
3,699,003 10/1972 Kronish et al. .................. 23/253 TP
3,783,696 1/1974 Coleman ............................. 23/292

Primary Examiner—Barry S. Richman
Assistant Examiner—Dale Lovercheck
Attorney, Agent, or Firm—David Robbins; Alvin Englert

[57] ABSTRACT

A thin plastic cell for use in a microcalorimeter having a barrier separating two liquids or a liquid and a solid to be subsequently mixed. The entire interior of the cell is made hydrophilic except for a thin hydrophobic strip forming a ring between the two compartments above the barrier.

8 Claims, 1 Drawing Figure

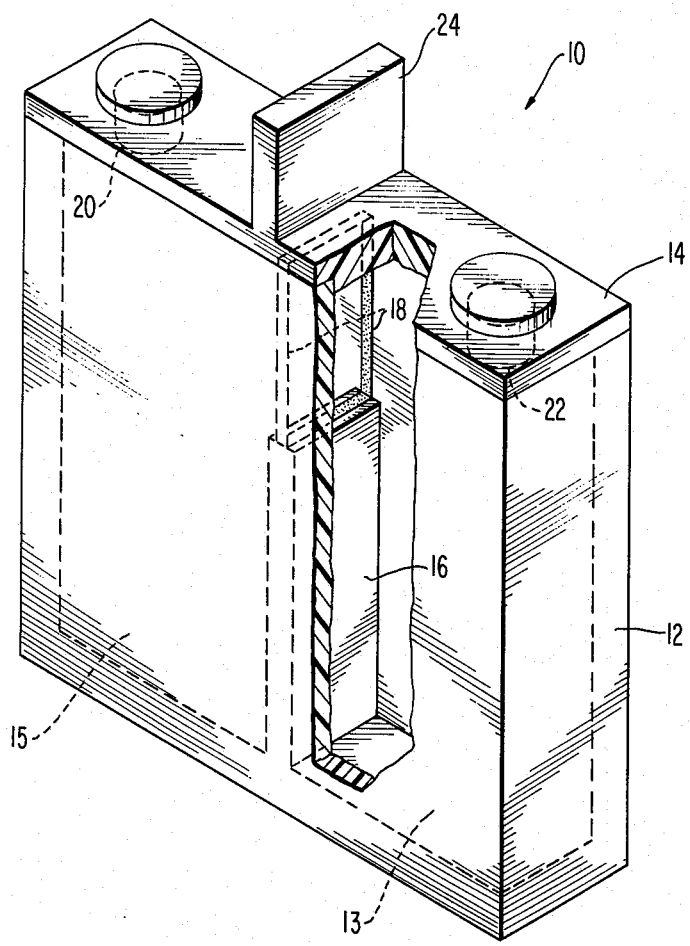

PLASTIC CELL FOR MIXING TWO LIQUIDS OR A LIQUID AND A SOLID

FIELD OF THE INVENTION

The present invention relates to a cell for use in microcalorimetry and more particularly to a miniaturized plastic cell for mixing small quantities of liquids or a liquid with a solid.

In many fields it is necessary to store two reactants in two compartments of a reaction vessel designed so that the reactants may contact one another when it is desired for the reaction to begin. This may easily be accomplished by storing the reactants in two separate compartments on the bottom of a cell and simply inverting the cell when it is desired for the reactants to be mixed.

Special problems exist however when the reaction vessel must be extremely small. With miniaturized reaction cells problems exist due to surface tension and capillary action.

One utility for such miniaturized reaction cells is in the field of microcalorimetry in which the heat producing or consuming characteristics of chemical and biochemical reactions in small quantities or liquids are investigated and analyzed by mixing the liquids in a reaction vessel encompassed by a thermopile encompassed by a heat sink and measuring the electrical signal caused by flow of heat through the thermopile between the reaction vessel and the heat sink. In most microcalorimetric apparatus the thinner the reaction vessel the better the results. Conventionally these reaction vessels are small thin plastic cells with a barrier separating the two liquids. Typical dimensions for such a cell are two centimeters by two centimeters by 0.34 centimeters. The two liquids must not mix as long as the cell is held upright but must readily mix when the cell is inverted. Due to the very small size of the cell undesirable prior mixing may be caused by capillary action or by creep along the inside surfaces of the cell. Furthermore, due to surface tension the liquids may not mix at all when the cell is inverted as they may stay in their own compartments and not drop into the mixing area even though inverted. It should be understood that if the interior of the cell is hydrophilic, then the problem of prior mixing due to capillary action becomes greater. If the interior surfaces are hydrophobic, then the problem of getting the liquids to flow downwards from their compartments upon inversion becomes more pronounced.

SUMMARY OF THE INVENTION

It is accordingly an object of the present invention to eliminate these deficiencies of the prior art.

It is another object of the present invention to provide a miniaturized cell for use in microcalorimetry separated into two compartments by a barrier in which there is no prior mixing of the liquids caused by capillary action or creep along the inside surfaces of the cell.

It is still another object of the present invention to provide a miniaturized cell for mixing two liquids or a liquid and a solid in which the liquids will readily flow upon inversion of the cell.

In accordance with the present invention the entire inner surface of the cell is made hydrophilic throughout except for a narrow hydrophobic strip above the barrier completely forming a hydrophobic ring between the two compartments. Further features of the invention and advantages gained thereby will become apparent to those skilled in the art from the following description of a preferred form of the invention which is diagrammatically illustrated in the accompanying drawings.

BRIEF DESCRIPTION OF THE DRAWING

The drawing is a perspective view, partially cut away, of the cell in accordance with the present invention.

DESCRIPTION OF PREFERRED EMBODIMENTS

The cell 10 of the present invention consists of a thin container 12 and cover 14. The interior of the cell 12 is divided into two compartments 13 and 15 by means of barrier 16. The barrier 16 extends approximately two-thirds of the height of the interior of the cell. The cover 14 preferably has holes 20 and 22 therein through which liquids can be injected into compartments 13 and 15. After injection, the holes 20 and 22 must of course be plugged in some manner. The cover 14 may also be provided with a handle 24.

To make these cells perform properly and reliably it is necessary to make the inner surfaces of the cell hydrophilic throughout except that they shall be hydrophobic in a narrow strip 18 above the barrier 16 completely forming a hydrophobic ring between the two compartments 13 and 15. The hydrophobic area is on the front and rear walls above the barrier as well as at the top of the barrier and at the bottom of the cover in order to form a complete separation of the hydrophilic areas which comprise the entire remainder of the inside of the cell 10.

The cells are preferably made of chlorotrifluoroethylene polymer such as Kel-F plastic. It should be understood however that the cells may be made of other materials such as polytetrafluoroethylene (Teflon), glass, other plastics, etc. depending upon its ultimate use. When the material of the cell is naturally hydrophobic such as Kel-F and Teflon, the cells may be made hydrophilic by dipping the complete cell and cover in sodium naphthenate solution. This process makes the entire cell hydrophilic and water readily spreads on its surfaces. By scraping away some of the surface on the areas desired, the hydrophobic base material is exposed thus forming the hydrophobic ring.

Alternatively, the barrier 16 could be left the full height of the cell 12 and then cut down to two-thirds height after the coating treatment. A little hump on the cover at the area to be hydrophobic may also be left upon fabrication which could subsequently be cut off after the coating treatment. This would also effectively leave the hydrophobic ring.

Another procedure would be to form a resist coating by means of wax or some other easily removable paste on the cell and cover where it is desired to have the hydrophobic surface. The waxed area will not be affected by the dipping treatment and may be dissolved off after the treatment.

The treatment with sodium naphthenate also allows the cover 14 to be sealed on the cell 12 for example with epoxy resin whereas it is normally difficult to get any sealant to stick to Kel-F or Teflon plastics.

When naturally hydrophilic materials are used for the cells, such as clean glass, the hydrophobic area can be produced by coating that area with a hydrophobic substance such as paraffin wax or Desicote.

It should be understood that the process used to make the interior of the cell hydrophilic except for a hydrophobic ring as described is not critical and any process for achieving this end may be used without departing from the present invention.

It should be pointed out that the hydrophobic barrier prevents creep and premature mixing. However, when the cell is inverted the liquid or liquids easily drop down to the cover and then the thin hydrophobic barrier is crossed by the sufficient weight or cross section of liquid.

A typical size for such a cell is about two by two by 0.34 centimeters with the hydrophobic area being about 1 millimeter wide. It should be understood that while the cells made in accordance with the present invention may be used for various utilities, it may specifically be used in the National Bureau of Standards Clinical Microcalorimeter as in tests described in National Bureau of Standards Report 73-180, April 1973 by Prosen et al., entitled "Testing of the NBS Clinical Mirocalorimeter". SUch a microcalorimeter is useful in assaying for glucose in human serum and plasma as is described by Goldberg et. al., Nationa Bureau of Standards Report 73-178, April 1973 or for determining fine structure in thermal growth patterns of bacteria as described by Staples et al., National Bureau of Standards Report 73-181, April 1973. The three National Bureau of Standards Reports discussed hereinabove are all hereby incorporated by reference.

It will be obvious to those skilled in the art that various changes may be made without departing from the scope of the invention and the invention is not to be considered limited to what is shown in the drawings and described in the specification. For instance, the lower part of one compartment of the cell may be treated with an enzyme permanently attached to the surface such that a solution containing serum would come in contact with the dry enzyme surface upon rotation of the cell.

I claim:

1. A cell for use as a miniature reaction vessel comprising:
   an enclosed container having top, bottom and side walls; and
   a barrier means separating said container into two compartments, said barrier means extending upwardly from said bottom wall, sealingly engaging said sidewalls and terminating short of said top wall leaving an opening between said barrier means and said top wall;
   wherein all of the surfaces on the interior of said container are made of a hydrophilic substance except for a ring of hydrophobic material extending around the perimeter of said opening.

2. A cell in accordance with claim 1 wherein said ring of hydrophobic naterial extends across the top of said barrier means, up the side walls of said container and across the top thereof opposite the top of said barrier means.

3. A cell in accordance with claim 1 wherein said container comprises a receptacle open at the top and a cover therefor and wherein said cover is sealed to said receptacle.

4. A cell in accordance with claim 1 wherein said container and barrier means are made of a hydrophobic material and the surfaces therof have a hydrophilic coating thereon except at the areas of said hydrophobic ring.

5. A cell in accordance with claim 1 wherein said container and barrier means are made of a hydrophilic material having a coating of hydrophobic material constituting said hydrophobic ring.

6. A cell in accordance with claim 1 wherein said hydrophobic ring is about 1 mm. wide.

7. A cell in accordance with claim 1 wherein said barrier means is integral with said container.

8. A cell in accordance with claim 1 wherein said barrier means extends approximately ⅔ the interior height of said container.

* * * * *